March 22, 1932.  J. T. PAIRO  1,850,634
ANIMAL TRAP
Filed March 26, 1930   2 Sheets-Sheet 1
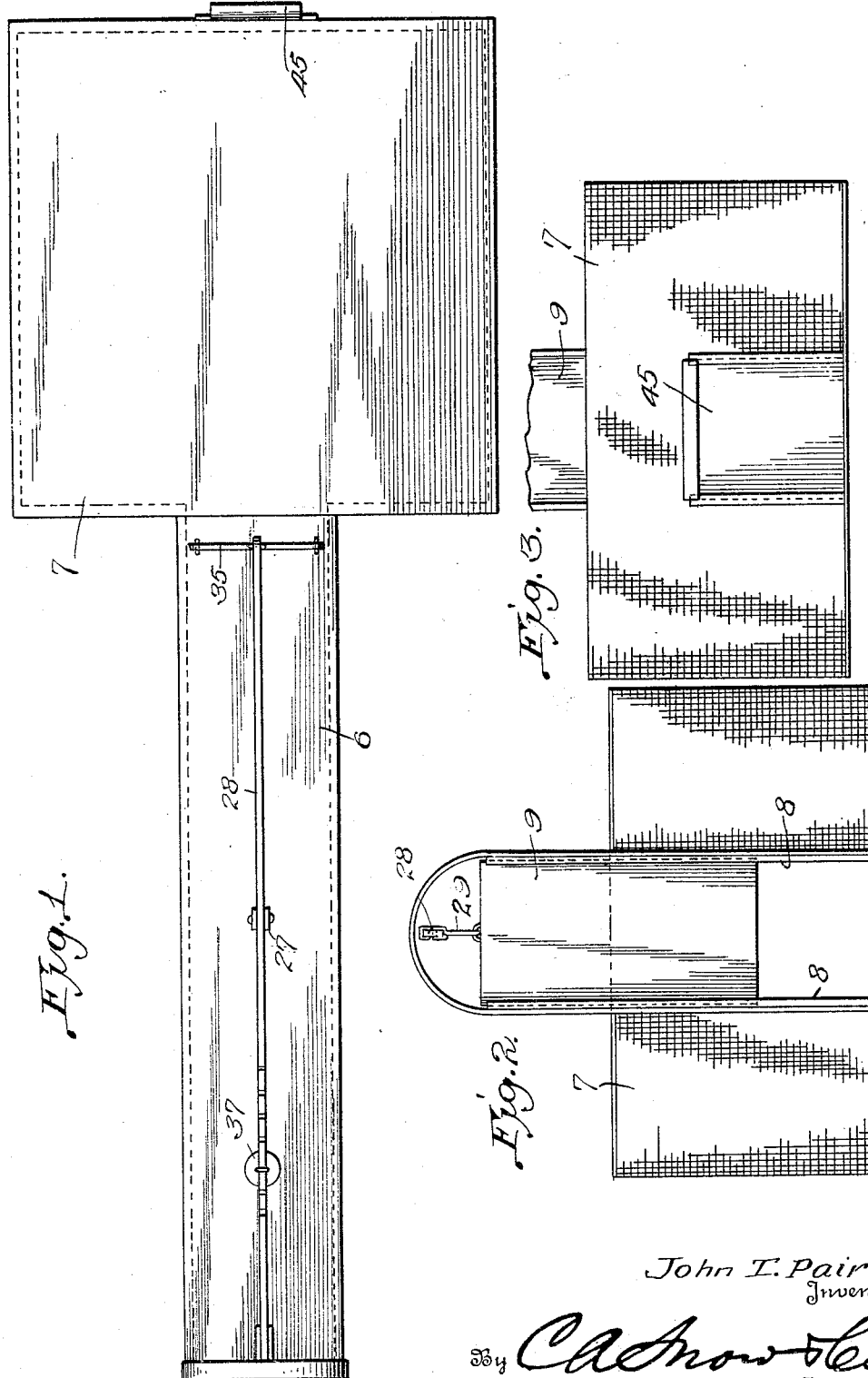
John T. Pairo
Inventor March 22, 1932.  J. T. PAIRO  1,850,634
ANIMAL TRAP
Filed March 26, 1930   2 Sheets-Sheet 2
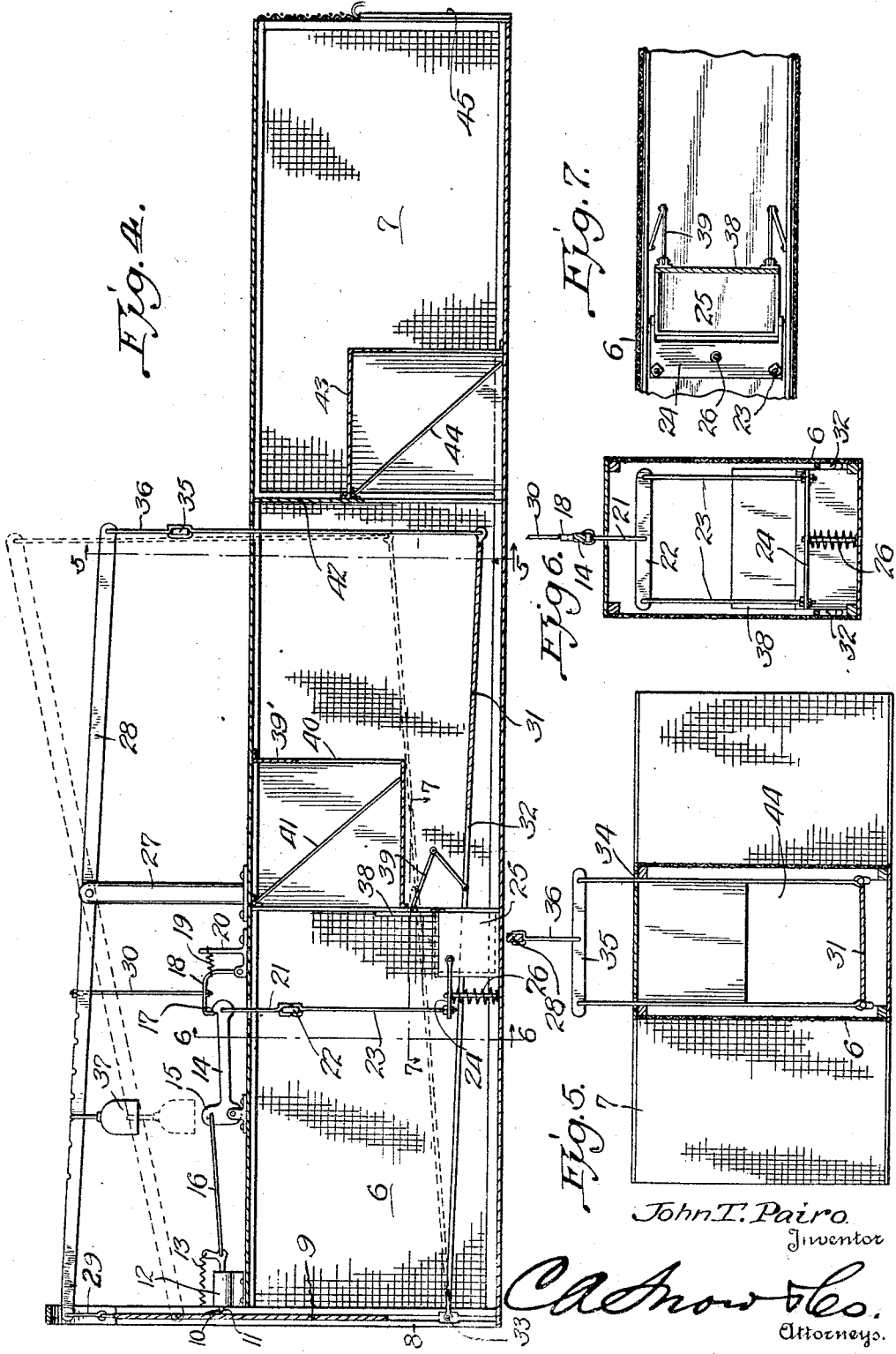
John T. Pairo,
Inventor
C A Snow & Co.
Attorneys.

Patented Mar. 22, 1932

1,850,634

UNITED STATES PATENT OFFICE

JOHN TALUM PAIRO, OF GREENVILLE, NORTH CAROLINA

ANIMAL TRAP

Application filed March 26, 1930. Serial No. 439,142.

This invention relates to traps especially designed for catching small animals such as rats or the like, the primary object of the invention being to provide a trap of this character that will be automatically set by the animal passing into the trap.

Another object of the invention is to provide a trap having a trapping compartment and a retaining compartment arranged in such relation with respect to each other that animals may pass from the trapping compartment into the retaining compartment and held captive therein until they can be killed or otherwise disposed of.

A still further object of the invention is to provide a bait box having a hinged closure which is closed by the animal passing into the trap, to prevent the animal from eating the bait, while held in captivity.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a plan view of a trap constructed in accordance with the invention.

Figure 2 is a front elevational view of the trap.

Figure 3 is a rear end elevational view of the trap.

Figure 4 is a longitudinal sectional view through the trap.

Figure 5 is a sectional view taken on line 5—5 of Figure 4.

Figure 6 is a sectional view taken on line 6—6 of Figure 4.

Figure 7 is a sectional view taken on line 7—7 of Figure 4.

Referring to the drawings in detail, the trap comprises a body portion which includes an elongated section 6 which, for the sake of convenience is termed the trapping section, and a substantially large section 7 termed the retaining compartment.

At the forward end of the trapping section 6, are guides 8 in which the vertically sliding closure 9 operates, the closure 9 being provided with a lug 10 on its inner surface to be engaged by the sliding latch member or bolt 11 supported within the casing 12 that is mounted on the upper surface of the trapping section 6, as clearly shown by Figure 4 of the drawings.

The upper edge of the lug 10 is beveled, so that upon upward movement of the closure 9, the lug will ride over the end of the bolt 11 to be engaged by the bolt and held against movement, to the end that the sliding closure is held in an open position.

A spring 13 is connected with the sliding bolt and acts to normally urge the bolt to its active position. The reference character 14 designates a pivoted latch which is mounted on the top of the trapping section 6, the latch 14 having an upstanding ear 15 formed with an opening to accommodate one end of the link 16 which is also connected with the bolt 11 to move the bolt to its inactive position, when the latch 14 is moved in a manner to be hereinafter more fully described.

A shoulder 17 is formed at the free end of the latch 14, and is engaged by the spring arm 18 to normally hold the latch member 14 in a set position. Connected with the spring arm 18, is a spring 19 which is anchored to the post 20 to hold the arm 18 in balance and exert a pressure against the shoulder 17.

Connected with the latch 14, is a rod 21 that has its lower end extended through an opening formed intermediate the ends of the bar 22 to which the rods 23 are connected, the rods 23 being also connected with the treadle 24 pivotally supported adjacent to the bait box 25, there being provided a coiled spring 26 directly under the treadle to normally urge the rods 23 upwardly after the animal has passed over the treadle, to return the latch 14 to its set position.

Supported on the top of the trapping section 6, is a post 27 to which the bar 28 is pivotally connected, the bar 28 being of a length to extend from one end of the trapping section 6, to the other end thereof. The front end of the bar 28 connects with the closure 9, through the medium of the link 29, so that movement of the bar 28 will result in a relative movement of the closure 9.

The bar 28 is also connected with the spring arm 18, through the medium of the rod 30 so that as the bar 28 moves to a position to slide the closure 9 to its open position, the arm 18 will move to engage the latch 14.

The reference character 31 designates a treadle that is supported within the trapping section, there being provided rods 32 extended forwardly from the treadle and pivotally connected with the body portion of the trap, at 33. Rods 34 are pivotally connected with the treadle 31 and extend upwardly where they connect with the bar 35 which is formed with an opening to accommodate the link 36 which is connected with the bar 28. Thus it will be seen that as the inner end of the treadle 31 is forced downwardly, the forward end of the bar 28 moves upwardly carrying the closure 9 with it, resetting the trap. A weight 37 is adjustably supported on the bar 28 to counterbalance the bar and insure an accurate operation of the trap.

A hinged closure 38 is operated by means of the arms 39 that are connected with the rods 32 to the end that the closure 38 will be moved to its open position upon downward movement of the treadle 31 so that the bait in the box 25 will be in full view to entice animals into the trap.

Within the trapping section 6, is a box-like member 39' that has an opening 40 at one side thereof to permit animals to pass from the box-like member into the inner end of the trapping section and onto the treadle 31, which normally rests in the dotted line position as shown by Figure 4.

Pivoted rods 41 are supported within the box-like member 39 and normally rest in inclined positions so that an animal may pass under the rods to enter the inner end of the trapping section, but will be prevented from returning into the front end of the trapping section.

The retaining section 7, which is substantially wide, is separated from the trapping section by means of the partition 42 which extends downwardly from the top of the trap, the lower end of the partitioning member being spaced from the bottom of the trap to permit an animal to pass from the section 6 to the retaining section.

A box-like member 43 guards the opening, and provides a housing for the pivoted rods 44 that are inclined in such a way as to permit the animals to pass thereunder to enter the retaining section 7. These rods will of course prevent the return of the animals to the trapping section.

An opening is formed in the end wall of the retaining section 7, and is normally closed by means of the closure 45, the opening providing means whereby the animals may be removed from the trap.

From the foregoing it will be seen that due to the construction shown and described, the trap is of the everset type, and the trap will continue to operate until it becomes filled with animals.

In the operation of the device, an animal passing into the trap will stand on the treadle 24 in an effort to obtain the bait. The weight of the animal will cause the latch member 14 to be pulled downwardly through the rods 23 and 21. This downward movement of the latch member 14 slides the bolt 11 inwardly out of engagement with the lug 10, allowing the weight to move the bar 28 and the closure 9 supported thereby, to a position to close the front end of the trap.

Simultaneously with the closing of the forward end of the trap, the closure 38 moves to close the bait box 25. The treadle 31 is now in an elevated position, or in the position shown by Figure 4 of the drawings, so that an animal passing through the trapping section, will walk onto the treadle, the weight of the animal moving the treadle downwardly, resetting the trap.

I claim:

1. In an animal trap, a body portion, a closure for closing one end of the body portion, a bait box within the body portion, a normally open cover for the bait box, a treadle within the body portion, means connecting the treadle and cover of the bait box to move the cover to its closed position when the treadle moves upwardly, and means controlled by the action of the treadle for moving the closure to its open position when the treadle moves downwardly.

2. In an animal trap, a body portion including an elongated trapping section and a substantially wide retaining section at one end of the trapping section and in communication with the trapping section, a vertically sliding closure at the front end of the trapping section for closing the trapping section, a pivoted bar mounted above the trapping section and having connection with the sliding closure at one end of the bar, a treadle within the trapping section, rods extending upwardly from the treadle and having connection with one end of the bar, a sliding bolt, means on the sliding closure and engaged by the sliding bolt to normally hold the sliding closure in its open position, a bait box, a pivoted treadle adjacent to the bait box to be actuated by the weight of the animal, a rod connected with the last mentioned treadle, a latch member to which the rod is connected, a rod connecting the latch member and sliding bolt to move the sliding bolt to its inactive position when the last mentioned treadle moves downwardly, and means carried by the pivoted bar for engaging the latch member to reset the latch member and sliding closure, when the first mentioned treadle moves downwardly under the weight of an animal passing through the trap.

3. In an animal trap, a body portion, a sliding closure for closing the front end of the body portion, a bar pivotally mounted above the body portion, means for pivotally connecting the bar and closure, a pivoted treadle within the body portion, means for connecting the opposite end of the bar and treadle so that the treadle and bar move in unison, a sliding bolt on the body portion and adapted to engage the sliding closure to normally hold the closure in its open position, a pivoted latch member on the body portion, a rod connecting the latch member and sliding bolt, said latch member having a notch at one end, a spring arm for engaging the notch to hold the latch member and sliding bolt in their active positions, a rod connecting the bar and spring arm to hold the spring arm in a position to be engaged by the latch member, a treadle within the body portion, rods connecting the last mentioned treadle and latch member to draw the latch member downwardly under the weight of an animal, to release the latch member and sliding bolt, and means on the bar for urging the closure to its closed position.

In testimony that I claim the foregoing as my own, I have hereto affixed my signature.

JOHN TALUM PAIRO.